United States Patent [19]

DeRoche et al.

[11] Patent Number: 5,569,068
[45] Date of Patent: Oct. 29, 1996

[54] METHOD AND APPARATUS FOR SKINNING FISH

[75] Inventors: Thomas J. DeRoche, Metairie; Valerie S. Melancon, River Ridge, both of La.; Matthew M. Lyle, Milton, Fla.

[73] Assignee: The Laitram Corporation, Harahan, La.

[21] Appl. No.: 458,742

[22] Filed: Jun. 2, 1995

[51] Int. Cl.⁶ .................................................. A22C 25/17
[52] U.S. Cl. ........................................ 452/127; 452/136
[58] Field of Search .................................... 452/127, 128, 452/125, 136

[56] References Cited

U.S. PATENT DOCUMENTS

| | | | |
|---|---|---|---|
| Re. 33,917 | 5/1992 | Lapeyre | 452/158 |
| 2,857,619 | 10/1958 | Massengill | 452/136 |
| 3,593,370 | 7/1971 | Lapeyre . | |
| 3,594,191 | 7/1971 | Lapeyre | 99/111 |
| 3,800,363 | 4/1974 | Lapeyre . | |
| 3,806,616 | 4/1974 | Mencacci et al. | 426/376 |
| 3,934,310 | 1/1976 | Bartels et al. | 452/127 |
| 4,216,565 | 8/1980 | Volk et al. | 452/138 |
| 4,380,849 | 4/1983 | Adkison et al. | 452/136 |
| 4,593,432 | 6/1986 | Hazenbroek | 452/136 |
| 4,649,604 | 3/1987 | Braeger . | |
| 4,738,004 | 4/1988 | Lapeyre . | |
| 4,748,721 | 6/1988 | Braeger | 452/127 |
| 4,748,724 | 6/1988 | Lapeyre . | |
| 4,765,030 | 8/1988 | Dubowik . | |
| 4,811,456 | 3/1989 | Heuvel | 452/136 |
| 4,847,954 | 7/1989 | Lapeyre et al. . | |
| 5,127,872 | 7/1992 | Mielnik | 452/128 |
| 5,135,432 | 8/1992 | Kristinsson | 452/160 |
| 5,181,879 | 1/1993 | Lapeyre et al. | 452/160 |
| 5,184,973 | 2/1993 | Orlando et al. | 452/125 |
| 5,197,916 | 3/1993 | Orlando et al. | 452/125 |
| 5,288,264 | 2/1994 | Braeger | 452/127 |
| 5,336,125 | 8/1994 | Despointes | 452/127 |

*Primary Examiner*—Willis Little
*Attorney, Agent, or Firm*—Pravel, Hewitt, Kimball & Krieger

[57] ABSTRACT

A method and apparatus for processing a fish body to remove skin therefrom includes a frame that supports multiple scraper arms. Each of the arms is pivotally or slideably mounted to the frame. Each of the arms has a first end portion attached to the frame at a structural support. The opposing end of the scraper arm is a "free" end that carries a scraper blade member. Each of the blade members has a holder portion and a blade portion pivotally connected to the blade holder. This pivotal attachment evenly distributes the scraping portion to the fish body during processing. By changing the tension of the springs that bias each arm into engagement with the fish body, the scraping tension can be adjusted so that it is very light. This prevents undesirable removal of the meat product that underlies the very thin skin outer surface.

28 Claims, 5 Drawing Sheets

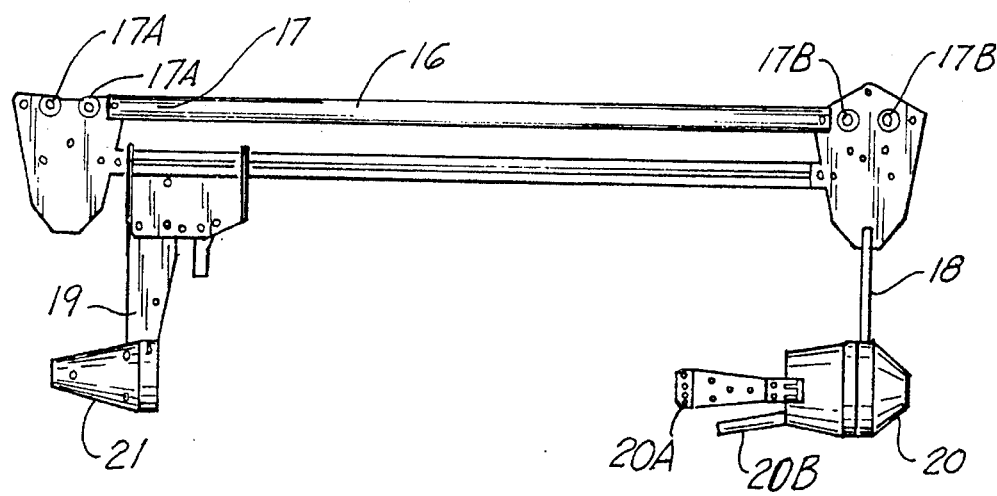
FIG. 8
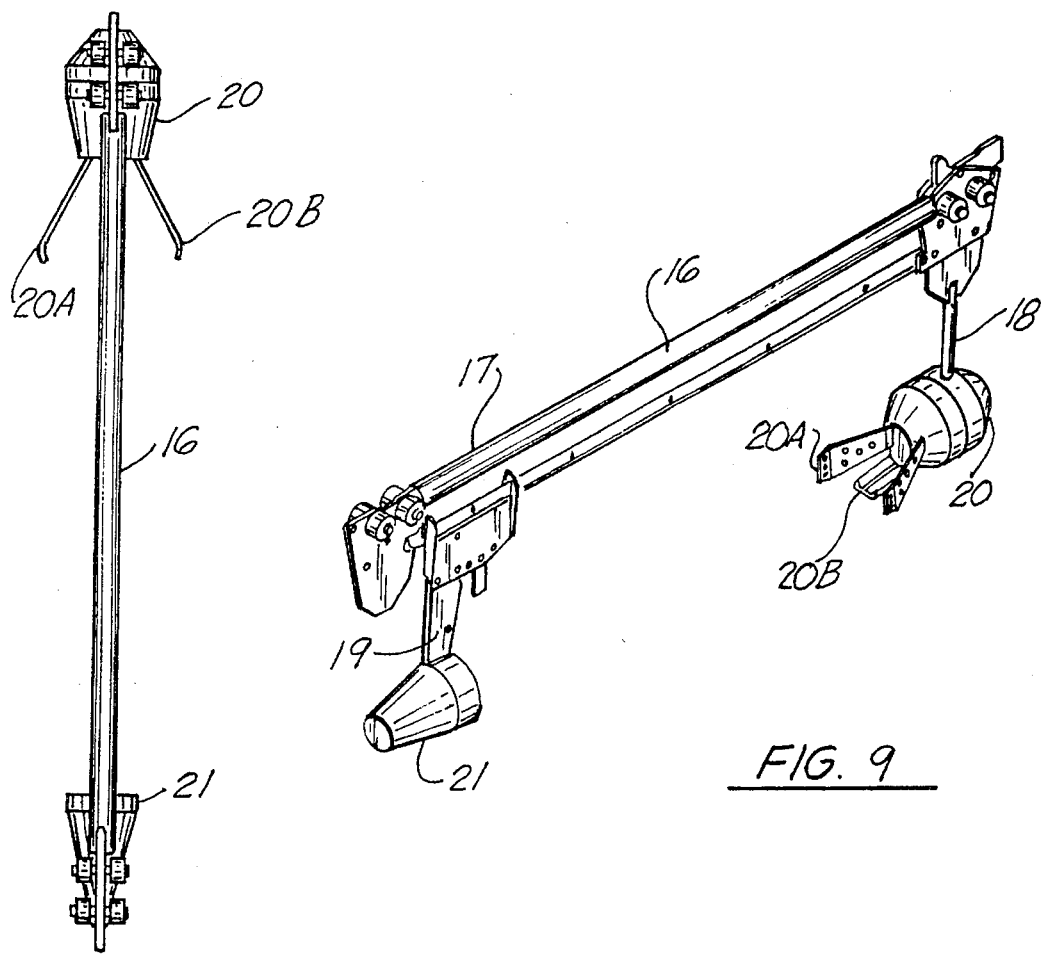
FIG. 10
FIG. 9

METHOD AND APPARATUS FOR SKINNING FISH

BACKGROUND OF THE INVENTION

1. Field of the Invention

The present invention relates to an improved fish processing apparatus that removes the skin from each of a plurality of conveyed fish bodies that are transported to blade members adjustably and movably supported by a supporting frame. The frame carries arms that have blade members at their distal ends, the blades being movable about a pivot to allow the scraping edge of each blade to move slightly side-to-side as the blade engages differing contours presented by the fish body during processing.

2. General Background

In the processing of fish such as tuna, undesirable skin and scales must be separated from the edible parts. In the processing of fish such as tuna, it is common to freeze a catch of fish at sea and to process the catch on shore. The processing normally involves thawing the fish followed by manual operations of slicing the fish belly and the removal of viscera. The visceral cavity is then washed with water and the tuna is inspected for spoilage. The tuna is then usually cooked whole in a batch type precooking operation.

Manual prior art methods of processing tuna are described in greater detail in U.S. Pat. No. 3,594,191 issued to J. M. Lapeyre. The '191 Lapeyre patent discloses the concept of cutting the tuna in lateral sections at spaced intervals and thereafter separating the edible loin portions to provide discrete cannable portions.

A later U.S. Pat. No. 3,593,370 entitled "Method of Butchering Tuna" issued to J. M. Lapeyre, describes a method for processing such transverse tuna sections while frozen. The method of butchering frozen tuna described in the '370 Lapeyre patent includes the subdivision of the whole fish into a plurality of transverse cross-sections and subsequently subdividing the cross-sections into frozen segments. The junctures between the segments are along lines generally parallel to the longitudinal axis of the fish and to the backbone thereof. Each lateral fish section is skinned and the skinned sections operated on to effect a separation of the scrap parts of the segments from the loin meat parts, while the latter were still in at least a partially frozen condition.

U.S. Pat. No. 3,800,363 issued to J. M. Lapeyre entitled "Tuna Butchering Method and System" describes an automated butchering method and system for separating the edible loin portions of transverse tuna slices provided by subdivision of a frozen whole tuna.

Three additional, more recently issued U.S. Patents that are owned by The Laitram Corporation, assignee of the present application, and relate to transverse fish section processing and water jet cutters include U.S. Pat. No. 4,748,724, entitled "Support Apparatus For Use In Video Imaging And Processing Of Transverse Fish Sections; U.S. Pat. No. Re. 33,917, entitled "Support Apparatus For Use In Video Imaging And Processing Of Transverse Fish Sections;" and U.S. Pat. No. 5,181,879 entitled "Method and Apparatus for Processing Fish Into Transverse Sections."

Patents have issued which relate to the problem of removing skin from fish that are to be processed. One recently issued U.S. Pat. No. 5,135,432 entitled "Method of and Machine for Cutting Nape Muscles from a Front Part of a Fish and Removing the Skin From the Nape Muscle" is issued to S. Kristinsson. The Kristinsson '432 patent discloses a method and a machine for cutting a nape muscle of a fish from the front part of a fish, after the fish has been parted, and removing the fish skin from the nape muscle. The method includes moving the front part along a fixed straight track to and past vertical circular knives which cut vertical cuts at each side of the spinal crest and at the same time to and past horizontal fixed knife blade edges, fixed on the leading portion of a plough structure, which in turn is fixed to the shaft mount for the shaft of the circular knives. The plough structure cuts lateral cuts from the spine to the skin, but not through the skin. The outer most side part of the plough structure, the plough spade, is not sharp and is used to tear the nape muscle from the attached skin, when the skin is pulled forward through a gap formed between the plough spade and a sliding table below the plough structure, the nape muscle being retained at the upper surface of the plough structure. The machine delivers the nape muscles without bones and without skin.

A fish skinner is disclosed in U.S. Pat. No. 5,184,973. The '973 patent discloses a process and apparatus for descaling tuna fish and the like wherein the fish is a least partially cooked and then cooled to a back bone temperature of about seventy to one hundred (70° F. to 100° F.) degrees Fahrenheit. The fish is placed on a conveyor and passed through horizontally and vertically disposed brushes. Jets of water are sprayed on the fish at the point of contact of the fish and the brushes to thereby wash away the scales and skin as removed by the brushes.

Another fish skinner patent is disclosed in U.S. Pat. No. 5,197,916. The '916 patent discloses a process and apparatus for skinning fish, particularly tuna fish which comprises passing a precooked fish body along conveyor belt means and the like while a series of rotating brushes above one side of and adjacent to the belly and back of the fish scrape the skin from those parts of the fish, passing the fish on the conveyor belt to a wheel around which the belt passes while a second belt contacts the opposite side of the fish and also passes around the wheel to hold the fish intact on the wheel until the fish is half way around the wheel and is turned over, depositing the turned over fish onto a third conveyor belt that receives the fish with the unscraped side thereof in the upper position, subjecting the unscraped side of the fish, and optionally, the belly and back thereof, to the rotating brushes to remove substantially all of the skin from the fish, and simultaneously spraying streams of water on the fish passing thereunder and the belts while removing skin from the fish and reducing deposit of the debris therefrom on the abrading apparatus.

SUMMARY OF THE INVENTION

The present invention provides an improved apparatus for processing a fish body to remove the skin therefrom. The apparatus provides an improvement over brush type skinners that have a tendency to dig into the desirable meat product that underlies the outer skin layer. This is a problem that has long plagued the art. Fish skin is quite thin and cannot easily be removed from a fish body without damaging the underlying meat.

The present invention solves this problem in a simple straight-forward yet effective manner by providing an improved apparatus for processing a fish body to remove the skin therefrom by using a multiple scraper blade arrangement that gives a controlled pressure distribution, insuring that excessive pressure is not applied between the blade assembly and the fish body for fish skin removal.

The apparatus of the present invention includes an elongated frame and a plurality of scraper arms mounted to the frame, each of the arms having a first end portion that attaches to the frame and a second "free" end portion. These arms pivot or adjust radially.

Each of the arms of the present invention carries a scraper blade member at the free end portion thereof. Each of the scraper blade members has edges for engaging the fish to be processed. A pivot joins each blade member to its support arm. Each blade pivots about an axis that allows the blade edge to change position responsive to changes in contour of the fish body being processed. This arrangement insures that pressure is applied from the blade edge to the fish skin. With the present invention, excessive pressure is avoided.

In the preferred embodiment, the frame is an elongated frame having an open-ended hollow bore through which fish bodies to be processed are conveyed.

In the preferred embodiment, the frame has first and second open end portions and a continuous bore. A conveyor carries fish bodies one at a time into the frame bore, from the inlet end portion to the outlet end portion.

In the preferred embodiment, the hollow bore has a central longitudinal axis that is tracked by each of the fish being processed.

In the preferred embodiment, a biasing means is provided for biasing each blade member to engage the outer surface of the fish body being processed with a desired pressure value. In the preferred embodiment, means are provided for adjusting the exact amount of pressure applied by the biasing system.

In a preferred embodiment, there are a plurality of blades disposed radially about the fish during processing.

In the preferred embodiment, each of the blade members is generally flat defining a plane. The plane is oriented at an acute angle relative to the outer surface of the fish body during processing. The acute angle preferably is between about ten and seventy (10° and 70°) degrees measured between the plane of the blade and the fish body outer surface during the scraping operation.

The present invention provides an improved method of removing skin from fish bodies to be processed. The method includes first transporting the fish bodies along a defined conveyor path with a mechanical holder. Each of the fish bodies is then scraped along its outer surface with a plurality of radially extending, circumferentially spaced blade members. Each of the blade members has an edge that engages and scrapes the fish skin from the fish body outer surface. Different blade members scrape different sections of fish skin from the fish body at circumferentially spaced positions about the fish body when referenced from the central longitudinal axis of the fish body. Enough scrapers are used so that all fish skin is removed as the conveyor transports the fish along a preselected path between starting and finishing positions.

Each of the blade assemblies is allowed to engage the different contours of the fish body outer surface.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 8 is a side, elevational view of the preferred embodiment of the apparatus of the present invention illustrating the fish body carrier portion thereof;

FIG. 9 is a fragmentary perspective view of the preferred embodiment of the apparatus of the present invention illustrating the fish body carrier; and FIG. 10 is a top fragmentary view of the preferred embodiment of the apparatus of the present invention illustrating the fish body carrier portion thereof.

DETAILED DESCRIPTION OF THE PREFERRED EMBODIMENT

Figure 1:
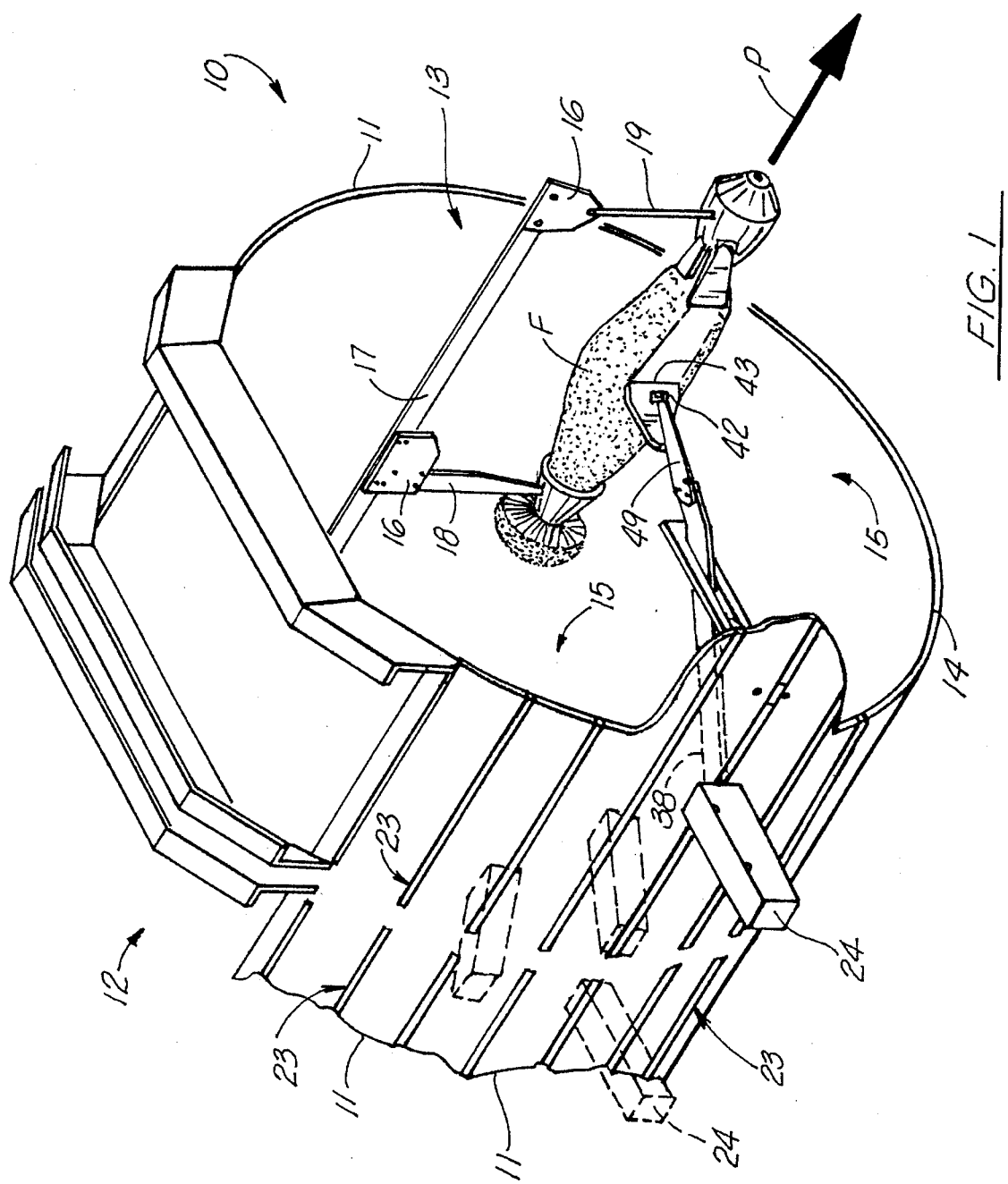
FIG. 1 is a fragmentary perspective view of the preferred embodiment of the apparatus of the present invention.

FIGS. 1 illustrates generally the preferred embodiment of the apparatus of the present invention designated generally by the number 10. Fish skinner apparatus 10 includes an elongated, preferably cylindrically shaped frame 11 having an open inlet portion 12 and open outlet portion 13.

It should be understood that a plurality of frames 11 can be arranged end to end with spaces therebetween so that a fish body can be handled in between spaced apart frames 11 such as for example by rotating the fish body about its central longitudinal axis a measure of degrees (for example 90°) before the fish body enters a second frame 11 for further processing.

Frame 11 is preferably in the form of a cylindrical wall 14 having a hollow bore 15. A conveyor 16 carries fish body carriers one at a time into the hollow bore 15 of each frame 11. The letter F is used to designate the fish body in the drawings.

Fish body carrier 16 (see FIGS. 1, 8–10) can ride upon a longitudinal rail that tracks a path generally parallel to the central longitudinal axis of hollow bore 15. Fish body carrier frame 17 supports each fish body F during processing. Frame 17 includes a pair of spaced apart vertical struts 18 and 19 each depending from horizontal frame section 17. The vertical struts 18, 19 support respective fish head and fish rear holders 20, 21. Fish head holder 20 attaches to the nose of the fish F and rear holder 21 attaches to the rear of the fish F. The tail of the fish body F is typically removed prior to processing by skinner apparatus 10. Wheels 17A, 17B can be provided to ride upon a track driven by a cog on a chain for example.

The front fish holder 20 is preferably a two part structure having a swivel that allows front and rear sections of the holder to rotate relative to one another. This facilitates a rotation of the fish body F into any desired rotational position about its central longitudinal axis. The fish body F can be transported with conveyor 16 into a first frame 11 for processing with the fish oriented vertically (i.e. its normal swimming position). The fish body F can then be rotated ninety degrees (90°) so that the fish body F is on its side for processing by an additional frame 11. Other rotational positions of the fish body F can be achieved by simply rotating the fish body about its central longitudinal axis using the rotating holders 20, 21.

Cylindrical wall 14 includes a plurality of longitudinally extending slots 23. Slots 23 extend circumferentially around cylindrically shaped wall 14. The combination of wall 14 and longitudinally extending, circumferential slots 23 provides an adjustable attachment for affixing blade supports 24 thereto. Blade supports 24 can be attached by welding, bolting, or the like directly to frame 11, with the blade support 24 being desirably positioned in a location that will maximize a scraping of skin from fish body F outer surface.

Figure 3:
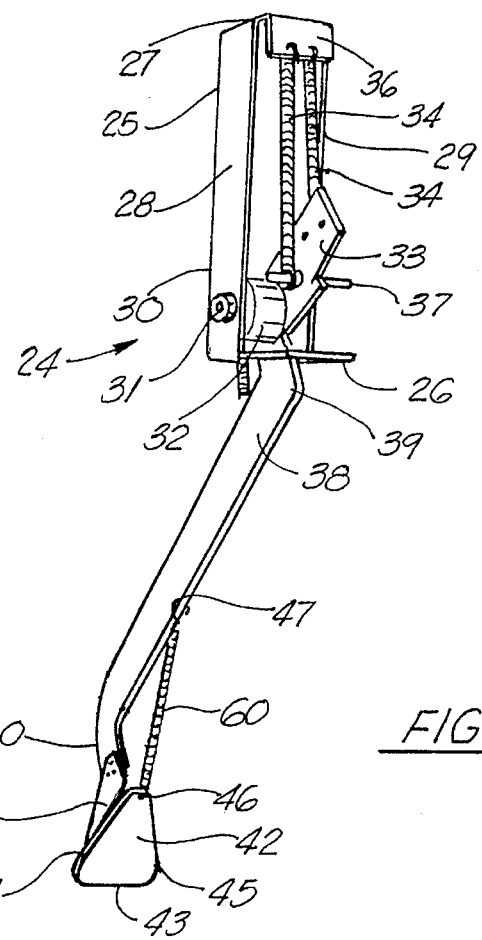
FIG. 3 is a partial perspective view of the preferred embodiment of the apparatus of the present invention illustrating the blade member and its pivoting support arm.

In FIG. 3, each blade support 24 includes a support box 25. Support box 25 includes an inner end wall 26 and outer end wall 27, side wall 28–29 and a rear wall 30.

Pivot pin 31 extends through support box 25, being supported at it ends by the box side walls 28, 29. Spring arm 33 is pivotally attached to pivot pin 31. Bushings 32 can be placed on opposite sides of spring arm 33. Each bushing 32 is positioned between a side wall 28, 29 and the spring arm 33. A pair of coil springs 34 extend between transverse pin 37 and spring holder plate 36. Transverse pin 37 is rigidly affixed to spring arm 33 such as by welding for example.

Figure 2:
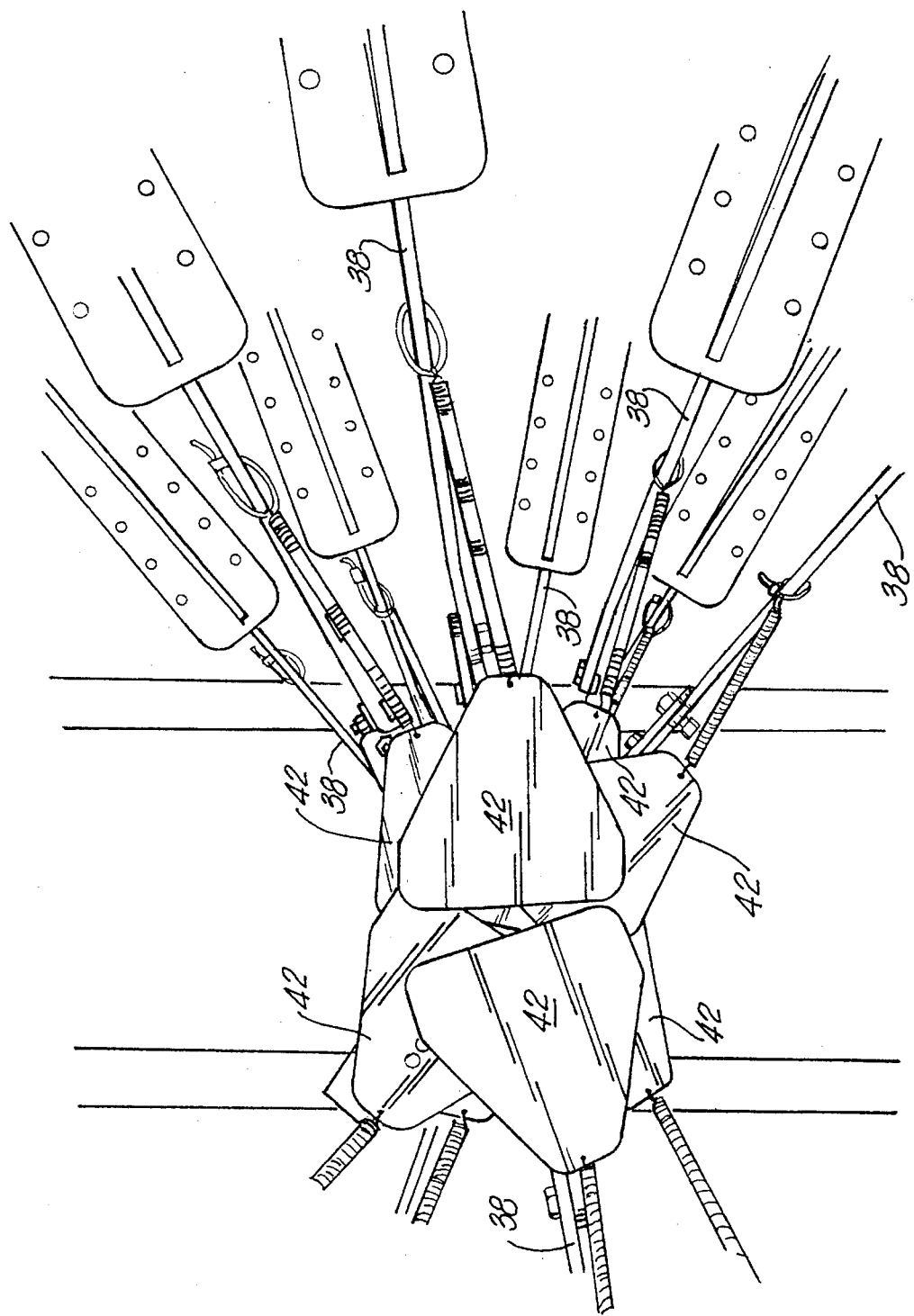
FIG. 2 is a partial front view of the preferred embodiment of the apparatus of the present invention showing multiples of the blade members before engaging a fish to be processed.

Scraper arm 38 is an elongated arm that is joined to spring arm 33 so that both arms 33, 38 pivot about pin 37. Scraper arm 38 extends into bore 15 of frame 11 during use for engaging each fish body F as it travels through bore 15 along a path designated generally by the arrow P in FIG. 1. A plurality of scraper arms 38, each supported by a blade support 24 and each having a scraper 42 are positioned circumferentially as shown in FIG. 2.

The desired placement of a particular blade 42 is achieved by simply placing blade support 24 in a desired location on frame 11, with arm 38 extending through one of the slots 23. Scraper arm 38 includes an end 39 and a free end 40. Blade member 41 is attached by bolting for example to distal end 40 of scraper arm 38.

In FIGS. 4–7, blade member 41 is shown more particularly. Blade member 41 includes a scraper 42 having a linear edge 43 that actually engages the fish body F outer surface during operation. Blade member 41 includes sides 44, 45. Spring attachment opening 46 on blade 42 receives a coil spring 60. Similarly, spring attachment opening 47 on arm 38 receives coil spring 60. The coil spring 60 orients the edge 43 so that the edge 43 will scrape the skin off the fish body F. Pivot 48 forms a rotating or pivoting connection between blade 42 and blade holder 49.

Figure 4:
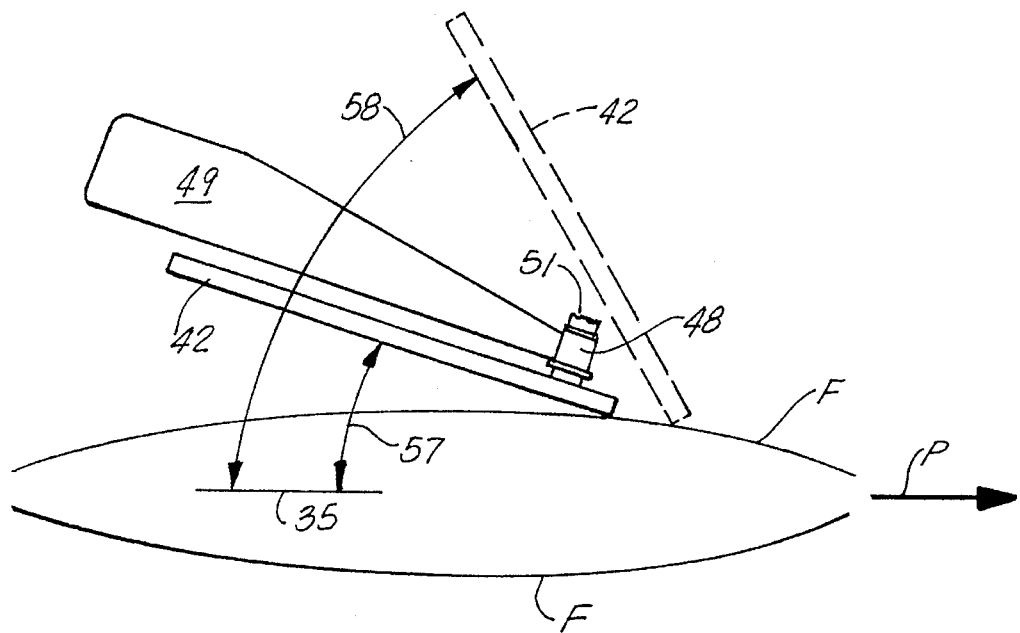
FIG. 4 is a partial perspective view of the preferred embodiment of the apparatus of the present invention illustrating a blade member and a fish body during scraping of the fish outer surface portion to remove the skin therefrom.
Figure 6:
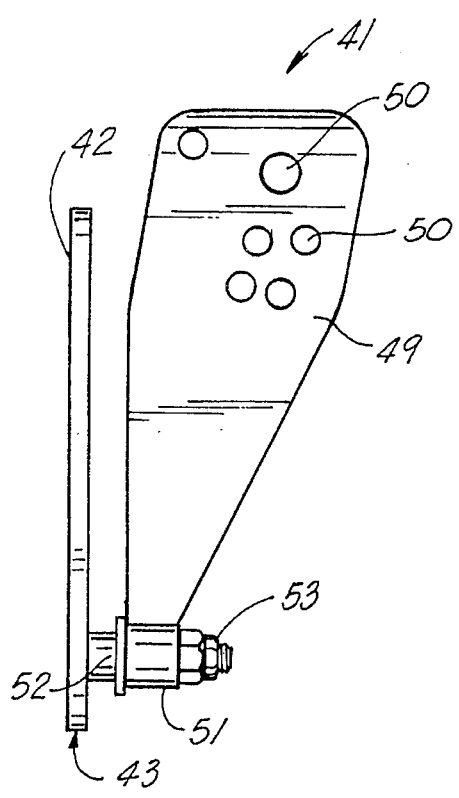
FIG. 6 a side view of the preferred embodiment of the apparatus of the present invention illustrating the blade member.
Figure 5:
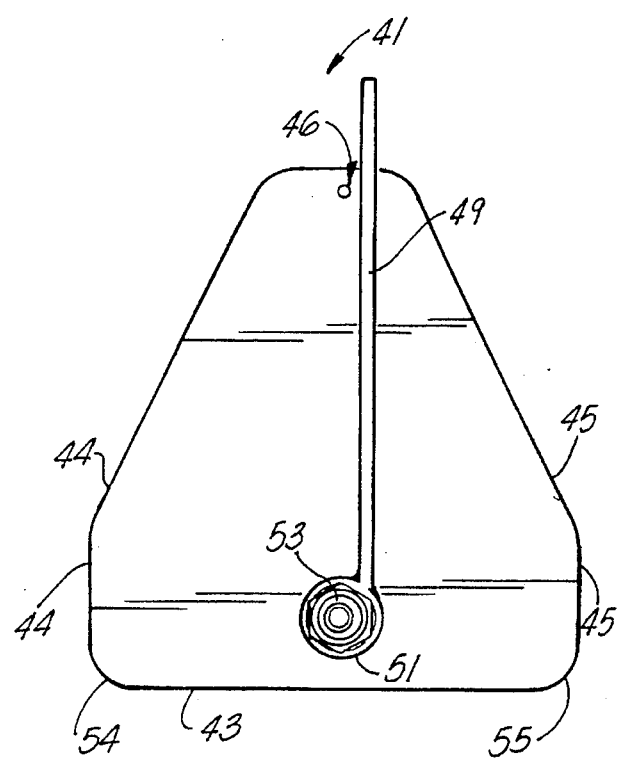
FIG. 5 is a partial top view of the preferred embodiment of the apparatus of the present invention illustrating the blade member.

A plurality of openings 50 on blade holder 49 allow adjustable attachment of blade holder 49 to the distal end 40 of scraper arm 38. Adjustment openings or slots on the distal end of scraper arm 38 allow an adjustable connection to be made between blade holder 49 and scraper 38 for varying the angle between scraper 42 and fish body F outer surface. In FIG. 4, the angle 57 shows a shallower angle formed between the fish body central axis, (designated as 35) and the plane of blade 42. A larger angle 58 shows another position that could be used for scraping fish body F outer surface using scraper 42.

The attachment of blade 42 to blade holder 49 includes a cylindrically shaped bushing 51 that is integrally attached by welding for example to blade holder 49. A small bushing 51 could be placed inside of bushing 48 to function as a bearing member. Blade 42 can have a bolt 53 welded thereto and extending therefrom for forming a bolted connection between holder 49 and blade 42, the bolted connection being designated generally as 53 in FIGS. 5–7. Blade 42 can be provided with rounded corners 54, 55 respectively between edge 43 and flat sides 44, 45.

Figure 7:
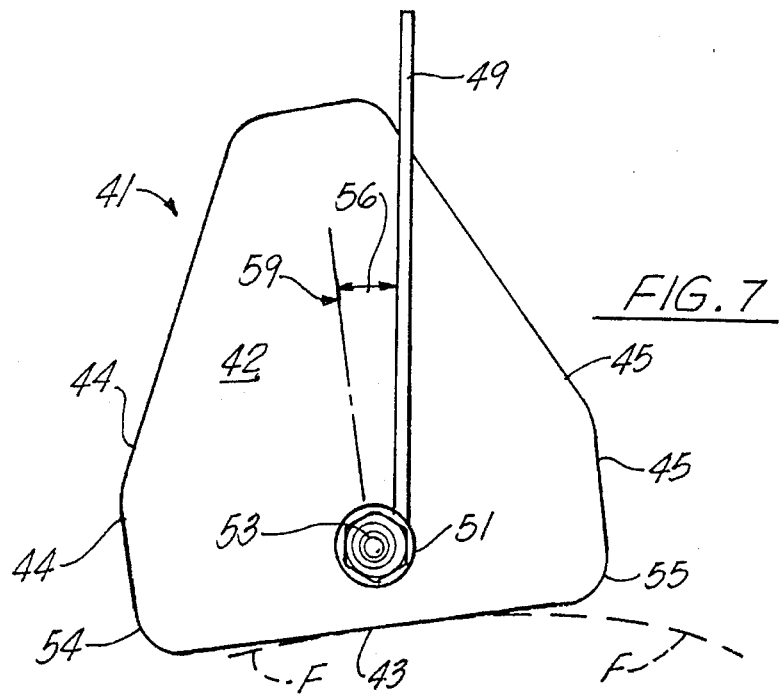
FIG. 7 is a top view of the preferred embodiment of the apparatus of the present invention showing pivotal movement of the blade member as occurs during scraping.

In FIG. 7, the angle 56 illustrates an automatic adjustment that is made between the edge 43 and the outer surface of the fish body F. During use, the blade 42 can pivot about its bolted connection 53. In FIG. 7, the angle 56 shows an angular displacement of blade axis 59 relative to the plane of holder 49. During use, the coil spring 60 can carry a very small amount of tension so that the coil spring 60 simply centers the axis 59 with the plane of holder 49 during use. However, this centering effect can become based upon a irregularities in the outer surface of the fish body F. Thus, the blade edge 43 always tracks the path of least resistance which necessarily maximizes the area covered by the edge 43 during scraping. This is important with fish that have been partially cooked for example, as the meat underlying the fish skin is very delicate and can easily be dislodged.

With the present invention, an automatic compensation pressure is thus provided to the blade member 41 and more particularly to its scraping edge 43 as the edge 43 encounters changes in the contour of the outer surface of the fish during use. By using the plurality of circumferentially placed blade members as shown in FIG. 4, maximum removal of fish skin can be achieved during each pass of the fish body F through a frame section 11.

The following Table I lists the parts as used in the specification and in the accompanying drawings including the part number and its description.

TABLE I

PARTS LIST

| Part Number | Part Description |
| --- | --- |
| 10 | fish skinner apparatus |
| 11 | frame |
| 12 | inlet end portion |
| 13 | outlet end portion |
| 14 | cylindrical wall |
| 15 | hollow core |
| 16 | fish body carrier |
| 17 | frame |
| 18 | vertical strut |
| 19 | vertical strut |
| 20 | head holder |
| 20A | head clamp |
| 20B | head clamp |
| 21 | fish rear holder |
| 23 | wall slots |
| 24 | arm support |
| 25 | arm support box |
| 26 | inner end wall |
| 27 | outer end wall |
| 28 | box side wall |
| 29 | box side wall |
| 30 | box rear wall |
| 31 | pivot pin |
| 32 | bushing |
| 33 | spring arm |
| 34 | spring |
| 35 | fish body central axis |
| 36 | spring holder plate |
| 37 | transverse pin |
| 38 | scraper arm |
| 39 | proximal end |
| 40 | distal end |

TABLE I-continued

PARTS LIST

| Part Number | Part Description |
| --- | --- |
| 41 | blade assembly |
| 42 | blade |
| 43 | edge |
| 44 | side |
| 45 | side |
| 46 | spring attachment opening |
| 47 | spring attachment opening |
| 48 | blade pivot |
| 49 | blade pivot |
| 50 | opening |
| 51 | bushing |
| 52 | shoulder bolt |
| 53 | bolted connection |
| 54 | rounded corner |
| 55 | rounded corner |
| 56 | angle |
| 57 | angle |
| 58 | angle |
| 59 | axis |
| 60 | coil spring |
| F | fish body |
| P | conveyor path |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for processing a fish body to remove the skin therefrom comprising:
   a) a frame;
   b) a plurality of radially extending, circumferentially spaced scraper arms mounted to the frame at spaced positions about the fish body to be processed, each of the arms having a first end portion attachable to the frame and a second end portion;
   c) each of the arms carrying a scraper blade member at the second end portion thereof, the scraper blades comprising:
      i) a blade member having an edge for engaging the fish to be processed;
      ii) a pivot that joins each blade member to an arm;
      iii) wherein the blade pivots about an axis that allows the blade edge to change position responsive to changes in contour of the fish body being processed; and
   d) wherein each arm scrapes a different segment of the fish body and the plurality of arms engage and scrape substantially all of the skin from the fish.

2. The apparatus of claim 1 wherein the frame is tubular in shape.

3. The apparatus of claim 1 wherein the frame is elongated having first and second end portions, and further comprising conveyor means for conveying a stream of fish bodies to be processed from the first end portion to the second end portion of the frame.

4. The apparatus of claim 2 wherein the frame has a hollow bore.

5. An apparatus for processing a fish body to remove the skin therefrom comprising:
   a) a frame;
   b) a plurality of scraper arms mounted to the frame, each of the arms having a first end portion attachable to the frame and a second end portion;
   c) each of the arms carrying a scraper blade member at the second end portion thereof, the scraper blades comprising:
      i) a blade member having an edge for engaging the fish to be processed;
      ii) a pivot that joins each blade member to an arm;
      iii) wherein the blade pivots about an axis that allows the blade edge to change position responsive to changes in contour of the fish body being processed; and
   d) biasing means for biasing the blade member to engage the outer surface of the fish body being processed.

6. The apparatus of claim 5 further comprising means for adjusting the pressure applied by the biasing means.

7. An apparatus for processing a fish body to remove the skin therefrom comprising:
   a) a frame;
   b) a plurality of scraper arms mounted to the frame, each of the arms having a first end portion attachable to the frame and a second end portion;
   c) each of the arms carrying a scraper blade member at the second end portion thereof, the scraper blades comprising:
      i) a blade member having an edge for engaging the fish to be processed;
      ii) a pivot that joins each blade member to an arm;
      iii) wherein the blade pivots about an axis that allows the blade edge to change position responsive to changes in contour of the fish body being processed; and
   d) wherein the blade member is a generally flat member defining a plane.

8. The apparatus of claim 7 wherein the plane forms an angle of between ten and seventy degrees with the fish body outer surface during scraping.

9. An apparatus for processing a fish body to remove the skin therefrom comprising:
   a) a frame;
   b) a plurality of radially and circumferentially extending scraper means movably mounted to the frame at spaced positions about the fish body, for engaging the fish with skin to be removed;
   c) each of said scraper means including a scraper blade member having an edge for engaging the fish to be processed, a pivot on each blade member and an attachment for supporting the blade member from the frame, wherein the blade edge can pivot about an axis that allows the blade edge to change position responsive to changes in contour of the fish body being processed; and
   d) wherein each arm scrapes a different segment of the fish body and the plurality of arms engage and scrape substantially all of the skin from the fish.

10. The apparatus of claim 9 wherein the frame is tubular in shape and further comprising moving arm means connecting the frame and the blade members.

11. The apparatus of claim 10 wherein the frame is elongated having first and second end portions, and further comprising conveyor means for conveying a stream of fish bodies to be processed from the first end portion to the second end portion of the frame.

12. An apparatus for processing a fish body to remove the skin therefrom comprising:

a) a frame;

b) scraper means movably mounted to the frame, for engaging the fish with skin to be removed; and c) said scraper means including a scraper blade member having an edge for engaging the fish to be processed, a pivot on each blade member and an attachment for supporting the blade member from the frame, wherein the blade edge can pivot about an axis that allows the blade edge to change position responsive to changes in contour of the fish body being processed d) wherein the frame is tubular in shape and further comprising moving arm means connecting the frame and the blade members;

e) wherein the frame is elongated having first and second end portions, and further comprising conveyor means for conveying a stream of fish bodies to be processed from the first end portion to the second end portion of the frame; and f) wherein the frame has a hollow bore occupied by the conveyor and the arm means during processing.

13. An apparatus for processing a fish body to remove the skin therefrom comprising:

a) a frame;

b) scraper means movably mounted to the frame, for engaging the fish with skin to be removed; and c) said scraper means including a scraper blade member having an edge for engaging the fish to be processed, a pivot on each blade member and an attachment for supporting the blade member from the frame, wherein the blade edge can pivot about an axis that allows the blade edge to change position responsive to changes in contour of the fish body being processed; and d) biasing means for biasing the blade member to engage the outer surface of the fish body being processed.

14. The apparatus of claim 13 further comprising means for adjusting the pressure applied by the biasing means, and including multiple springs, each of different spring constant.

15. An apparatus for processing a fish body to remove the skin therefrom comprising:

a) a frame;

b) scraper means movably mounted to the frame, for engaging the fish with skin to be removed; and c) said scraper means including a scraper blade member having an edge for engaging the fish to be processed, a pivot on each blade member and an attachment for supporting the blade member from the frame, wherein the blade edge can pivot about an axis that allows the blade edge to change position responsive to changes in contour of the fish body being processed; and d) wherein the blade member is a generally flat member defining a plane.

16. The apparatus of claim 15 wherein the plane forms an angle of between about ten and seventy degrees (10°–70°) with the fish body outer surface during scraping.

17. A method of processing fish bodies to remove skin therefrom comprising the steps of:

a) transporting the fish body along a defined path with a mechanical holder;

b) scraping the fish body outer surface with a plurality of scraper blade members, each with a blade edge for engaging and scraping the fish skin from the fish body outer surface, the edges being positioned radially about the central longitudinal axis of the fish body during use; and c) allowing each of the blades to move as the blades engage differing contours of the fish body outer surface.

18. The method of claim 17 further comprising the step before step "a" of cooking at least the outer surface portion of the fish body.

19. The method of claim 17 further comprising the step of conveying a stream of fish bodies to the frame with a conveyor.

20. The method of claim 19 wherein the blades are positioned on a conveyor path that transports each fish body to the blades.

21. The method of claim 18 wherein the fish bodies are steamed to cook the outer surface portion of the fish bodies to be processed.

22. The method of claim 17 further comprising the step of angling the blade members relative to the fish body outer surface so that the blade member forms an acute angle with the fish body outer surface.

23. The method of claim 22 wherein the blade members form an angle of between 10° and 70° with the fish body outer surface.

24. The method of claim 17 further comprising the step of positioning the blade members in spaced apart positions along the length of the fish body section during use.

25. The method of claim 17 further comprising the step of pivoting the blade members as the blade edges engage differing contours of the fish body section.

26. The method of claim 17 further comprising the step of adjustably mounting the blade members relative to the frame at selected positions that are radially and longitudinally spaced about the frame to accommodate different diameters of fish.

27. The method of claim 17 further comprising the step of positioning the blade edge members transversely relative to the central longitudinal axis of the fish body being processed.

28. The method of claim 17 further comprising the step of rotating the fish body about its central longitudinal axis during processing.

* * * * *